A. L. STARK.
METHOD OF MAKING PRECIPITATED ANTIMONY SULPHIDE.
APPLICATION FILED JUNE 1, 1920.
1,414,837.
Patented May 2, 1922.
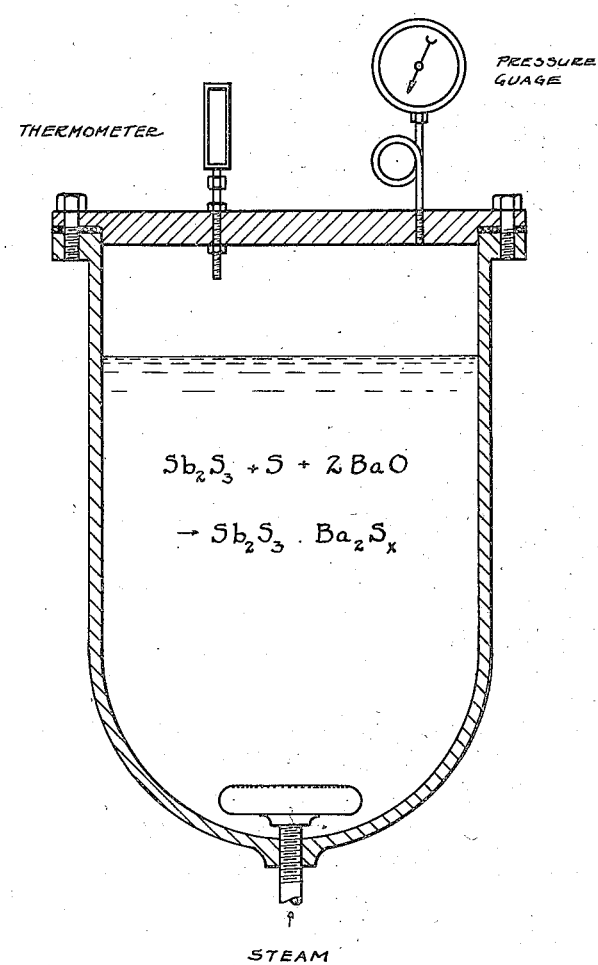
INVENTOR
Arthur L. Stark.
By Day, Oberlin & Day
ATTORNEYS

UNITED STATES PATENT OFFICE.

ARTHUR L. STARK, OF ELYRIA, OHIO, ASSIGNOR TO THE STIBIUM PRODUCTS COMPANY, OF ELYRIA, OHIO, A CORPORATION OF OHIO.

METHOD OF MAKING PRECIPITATED ANTIMONY SULPHIDE.

1,414,837.

Specification of Letters Patent.

Patented May 2, 1922.

Application filed June 1, 1920. Serial No. 385,641.

*To all whom it may concern:*

Be it known that I, ARTHUR L. STARK, a citizen of the United States, and a resident of Elyria, county of Lorain, and State of Ohio, have invented a new and useful Improvement in Methods of Making Precipitated Antimony Sulphide, of which the following is a specification, the principle of the invention being herein explained and the best mode in which I have contemplated applying that principle, so as to distinguish it from other inventions.

The term "sulphurette" is ordinarily employed in the trade to distinguish the product of the improved method in hand, the reference being to the precipitated sulphide, in contradistinction to the natural or, fused articles. The term in question, in other words, is thus employed to designate artificially produced antimonic or penta-sulphide $(Sb_2S_5)$, or a mixture of such penta-sulphide with antimonous or tri-sulphide $(Sb_2S_3)$, such antimony sulphurette varying in color from yellow to orange red, depending upon the proportion of the penta-sulphide present, whereas the natural sulphide is black. As is well known, the so-called sulphurette is largely used for vulcanizing rubber or caoutchouc, imparting a red color thereto.

As in the production of antimony ore, so for the manufacture of the compound in hand, the commercially available form of raw material is stibnite or needle antimony, which is derived from the naturally occurring gray antimony ore, and consists essentially of the tri-sulphide. The ore in question is first liquated in such a manner as to separate the sulphide from any rocky matter associated therewith, and the object of the present invention is to provide an improved process for the conversion of this material into the desired product with a minimum of waste. At the same time the product is secured in a finely divided form that renders it especially suitable for the intended use.

To the accomplishment of the foregoing and related ends, the invention, then, consists of the steps hereinafter fully described and particularly pointed out in the claims, the annexed drawing and the following description disclosing but several of the various ways in which the principle of the invention may be carried out.

In said annexed drawing:—

The single figure there appearing is a more or less diagrammatic representation of an apparatus suitable for carrying out my present improved process.

As previously indicated, the material utilized as the starting point for the present method or process will ordinarily consist of the crude tri-sulphide or stibnite. This is first ground to a fine impalpable powder. Thereupon sulphur and a compound capable of forming a soluble double salt with antimony are added. As examples of compound suitable for the purpose, I may mention quick lime $(CaO)$, barium oxide $(BaO)$, and strontium oxide $(SrO)$, which may be generically referred to as oxides of the alkaline earth metals, it being understood that these, as a matter of fact, are converted promptly into the corresponding hydrates as the result of the addition of water as called for by the process, and if desired such hydrates may be directly admixed with the other ingredients named above. I have also found that corresponding oxygen compounds of the alkali metals are satisfactory for the purpose, for example potassium hydrate $(KOH)$, sodium hydroxide $(NaOH)$, or lithium hydroxide $(LiOH)$. It will also be understood that mixtures of two or more of the foregoing oxygen compounds of either or both series may be employed.

Both the sulphur and such compounds are in powdered form, and are thoroughly intermixed with each other and with the powdered stibnite. Thereupon the mixture is gradually moistened with water until a pasty or slightly fluid mass is formed, following which a quantity of the mixture thus prepared is placed, with more water, in an autoclave and boiled under pressure at a high temperature, the boiling being preferably accomplished by injecting steam at the bottom of such autoclave, as illustrated in the drawing. The steam not only serves to bring the mixture to the desired temperature, but also to agitate the same, where the autoclave is of the ordinary type illustrated without it being necessary to employ a mechanical agitator. The treatment in question being continued until substantially all of the solid constituents have been converted into the water-soluble double salt of antimony; for example, double antimony barium sulphide ($Sb_2S_3.aBaS_x$), where the compound employed, along with the sulphur, is barium oxide.

The solution thus obtained is then removed and, upon addition to a suitable acid, either hydrochloric or sulphuric acid, the desired antimony sulphide or sulphurette, consisting principally, if not altogther, of the penta-sulphide, is precipitated out in the form of a very fine impalpable powder. Assuming that relatively pure stibnite is being used, approximately equal parts of stibnite, sulphur and the third ingredient are employed, and in order to convert the mixture of the same into the water-soluble double sulphide, the treatment in the autoclave is conducted under a pressure of approximately sixty to eighty pounds, and at a temperature of approximately 145° to 155° C.

By my improved process, not only is a more complete absorption of the raw materials, i..e. of the stibnite, sulphur and third ingredient, secured, so that very little of such material is lost in the form of sludge, but the conversion takes place very rapidly. By thus requiring a relatively small amount of material to be in process, a marked economy is effected, at the same time that a superior product is obtained.

It will be understood that stibnite is the preferable form of the antimony sulphide used in the process only because it is ordinarily the form most readily and cheaply to be had. However, other forms of the sulphide, whether similarly naturally derived or artificially produced may be satisfactorily substituted, and the metal itself may be employed if the proper additional amount of sulphur to convert the same into the sulphide be included. It will be understood accordingly that any of the foregoing or various mixtures of the same may be employed in my improved method or process as the equivalent of the stibnite particularly specified.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. In a method of making precipitated antimony sulphide, the steps which consist in mixing finely ground stibnite, sulphur and a compound capable of forming a water-soluble double salt with antimony together with water, and heating under pressure at an elevated temperature, whereby such water-soluble double sulphide of antimony and of the metal forming the basis of such third ingredient is obtained.

2. In a method of making precipitated antimony sulphide, the steps which consist in mixing finely ground stibnite, sulphur and a compound capable of forming a water-soluble double salt with antimony together with sufficient water to form a paste, adding the resulting mixture to a body of water, and heating under pressure at an elevated temperature, whereby a water-soluble double sulphide of antimony and of the metal forming the base of such third ingredient is obtained.

3. In a method of making precipitated antimony sulphide, the steps which consist in mixing finely ground stibnite, sulphur and a compound capable of forming a water-soluble double salt with antimony together with sufficient water to form a paste, adding the resulting mixture to a body of water, and heating under a pressure of approximately sixty to eighty pounds and at a temperature of approximately 145° to 155° C., whereby a water-soluble double sulphide is obtained.

4. In a method of making precipitated antimony sulphide, the steps which consist in mixing finely ground stibnite, sulphur and a compound capable of forming a water-soluble double salt with antimony together with sufficient water to form a paste, adding the resulting mixture to a body of water in an autoclave, and then injecting steam into such autoclave so as to agitate and heat the mixture and water to a temperature of approximately 145° to 155° C. under a pressure of approximately sixty to eighty pounds, whereby a water-soluble double sulphide is obtained.

5. In a method of making precipitated antimony sulphide, the steps which consist in mixing finely ground stibnite, sulphur and a compound capable of forming a water-soluble double salt with antimony together with sufficient water to form a paste, adding the resulting mixture to a body of water, heating under pressure at an elevated temperature, whereby a water-soluble double sulphide of antimony and of the metal forming the base of such third ingredient is obtained, and then adding same to a mineral acid, whereby antimony penta-sulphide is precipitated.

6. In a method of making precipitated antimony sulphide, the steps which consist in mixing finely ground stibnite, sulphur and an oxide of an alkaline earth metal with water and heating under pressure at an elevated temperature, whereby a water soluble double sulphide of antimony and such metal is obtained.

7. In a method of making a precipitated antimony sulphide, the steps which consist in mixing finely ground stibnite, sulphur and an oxide of an alkaline earth metal with sufficient water to form a paste, adding the resulting mixture to a body of water and heating under pressure at an elevated temperature, whereby a water-soluble double sulphide of antimony and such metal is obtained.

8. In a method of making a precipitated antimony sulphide, the steps which consist in mixing finely ground stibnite, sulphur and barium oxide with sufficient water to form a paste, adding the resulting mixture to a body of water and heating under pressure at an elevated temperature, whereby a water-soluble double sulphide of antimony and barium is obtained.

Signed by me, this 27 day of May, 1920.

ARTHUR L. STARK.